United States Patent
Sharan

(10) Patent No.: US 6,175,676 B1
(45) Date of Patent: Jan. 16, 2001

(54) FIBER OPTIC SENSOR AND METHOD OF USE THEREOF TO DETERMINE CARBON CONTENT OF MOLTEN STEEL CONTAINED IN A BASIC OXYGEN FURNACE

(75) Inventor: Alok Sharan, Easton, PA (US)

(73) Assignee: Bethlehem Steel Corporation (*) Notice: Under 35 U.S.C. 154(b), the term of this patent shall be extended for 0 days.

(21) Appl. No.: 09/256,166

(22) Filed: Feb. 23, 1999

(51) Int. Cl.[7] ........................................ C21C 5/30
(52) U.S. Cl. .................. 385/100; 385/12; 385/147; 75/375; 250/554; 260/78; 260/80; 260/99; 356/72
(58) Field of Search .................... 75/375; 266/78, 266/80, 99; 356/72; 250/554; 385/12, 117, 118, 147, 100

(56) References Cited

U.S. PATENT DOCUMENTS

| | | |
|---|---|---|
| 3,591,296 | 7/1971 | Kunioka et al. |
| 3,719,469 | 3/1973 | Roessing ................................ 75/60 |
| 3,741,557 | 6/1973 | Harbaugh et al. .................... 266/35 |
| 4,106,756 | 8/1978 | Rymarchyk et al. ................. 266/99 |
| 4,575,185 * | 3/1986 | Wentzell ............................ 350/96.26 |
| 4,651,976 | 3/1987 | Arima et al. ........................ 266/44 |
| 4,657,014 | 4/1987 | Edelman et al. ................... 128/303.1 |
| 4,824,202 | 4/1989 | Auras ................................ 350/96.18 |
| 5,095,517 | 3/1992 | Monguzzi et al. ................... 385/90 |
| 5,522,915 * | 6/1996 | Ono et al. ........................... 75/385 |
| 5,603,746 | 2/1997 | Sharan ............................... 75/375 |
| 5,764,837 | 6/1998 | Roller ................................ 385/92 |
| 5,778,124 | 7/1998 | Nedstedt ........................... 385/79 |

FOREIGN PATENT DOCUMENTS

| | | |
|---|---|---|
| 1082927 | 6/1960 | (DE). |
| 2015788 | 10/1970 | (DE). |
| 0162949 | 12/1985 | (EP). |
| 2687220 | 8/1993 | (FR). |
| 1183281 | 3/1970 | (GB). |
| 8902069 | 3/1989 | (WO). |

* cited by examiner

Primary Examiner—Hung N. Ngo
(74) Attorney, Agent, or Firm—Harold I. Masteller, Jr.

(57) ABSTRACT

The invention is directed to a gas cooled fiber-optic cable apparatus for use in a hostile environment, for instance adjacent a metallurgical furnace, and a method using the apparatus to determine carbon content of molten steel. The fiber-optic cable includes a radiation collection end comprising a manifold chamber that surrounds the fiber-optic cable filaments used to collect radiant energy emitted from the furnace flame. The manifold includes a tip portion having an orifice to expose the filaments to the radiant energy, and a gas supply attached to the manifold to inject a cooling gas into the chamber. The orifice provides a discharge for expelling the cooling gas from the manifold chamber at a high velocity purge to prevent foreign matter from entering the chamber. The gas cooled fiber-optic cable transmits collected radiant energy to a radiation sensor. The sensor converts the energy into voltage signals and the signal information is processed to determine carbon content of steel contained in the metallurgical furnace.

28 Claims, 7 Drawing Sheets

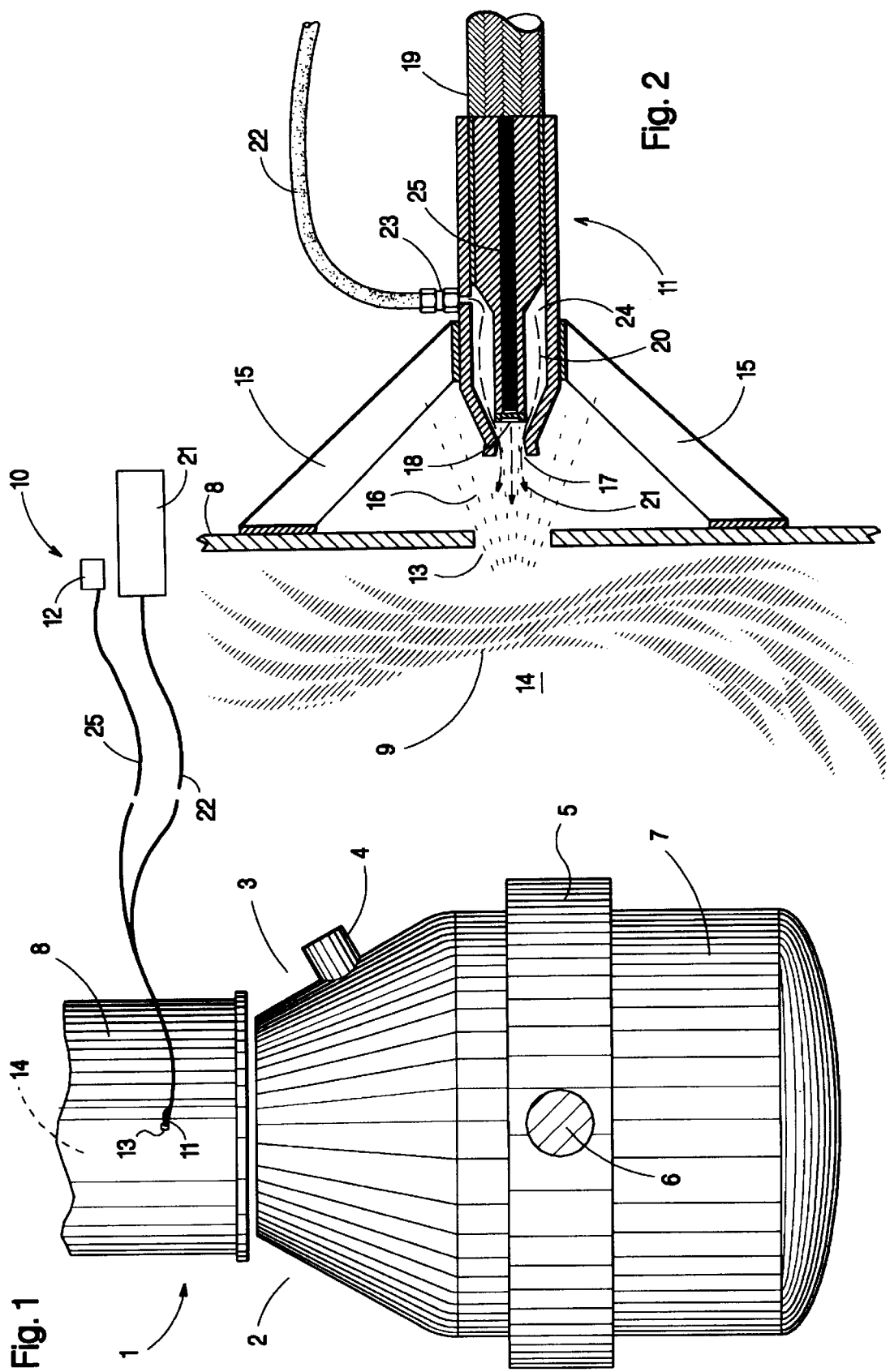

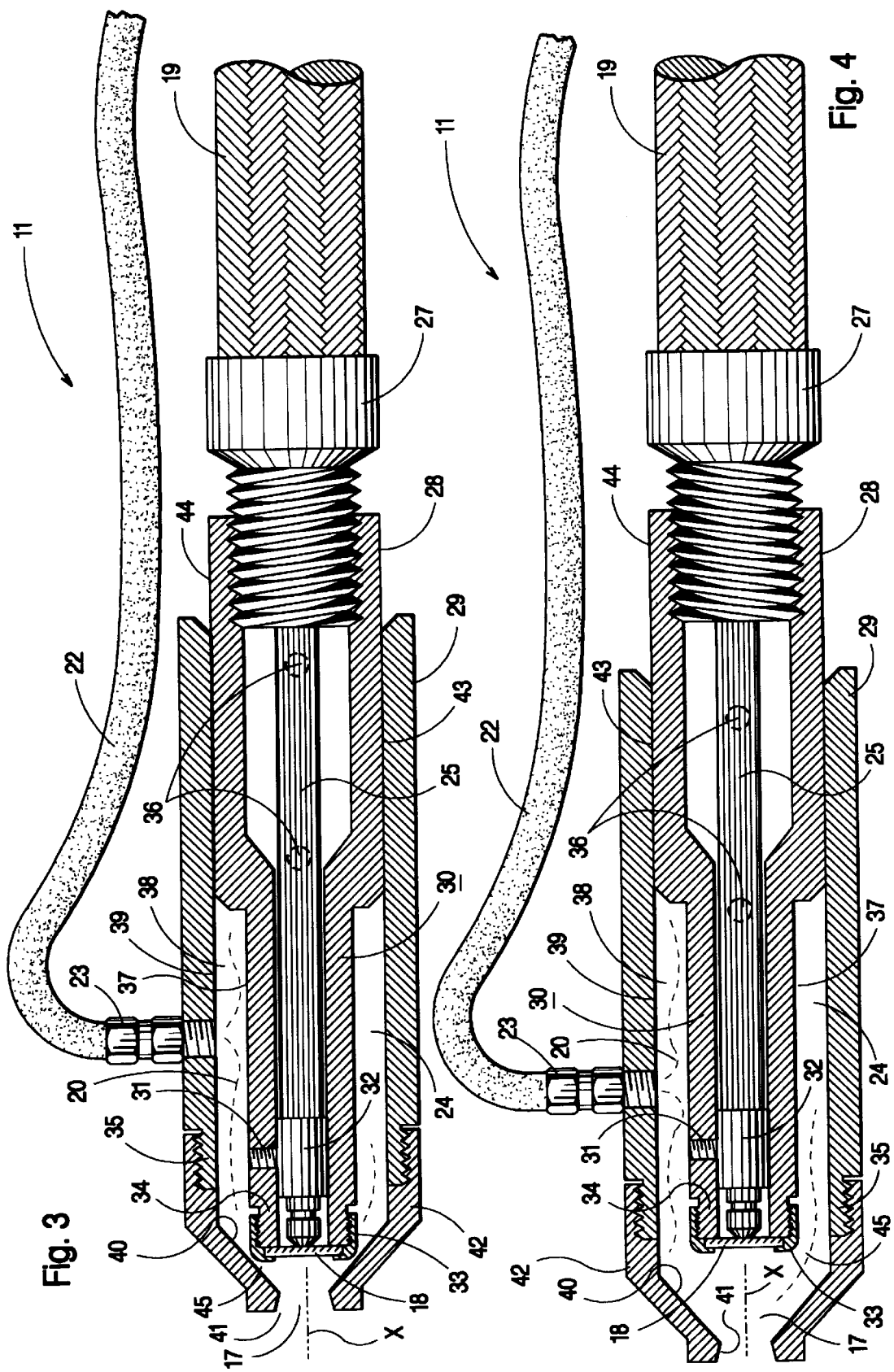

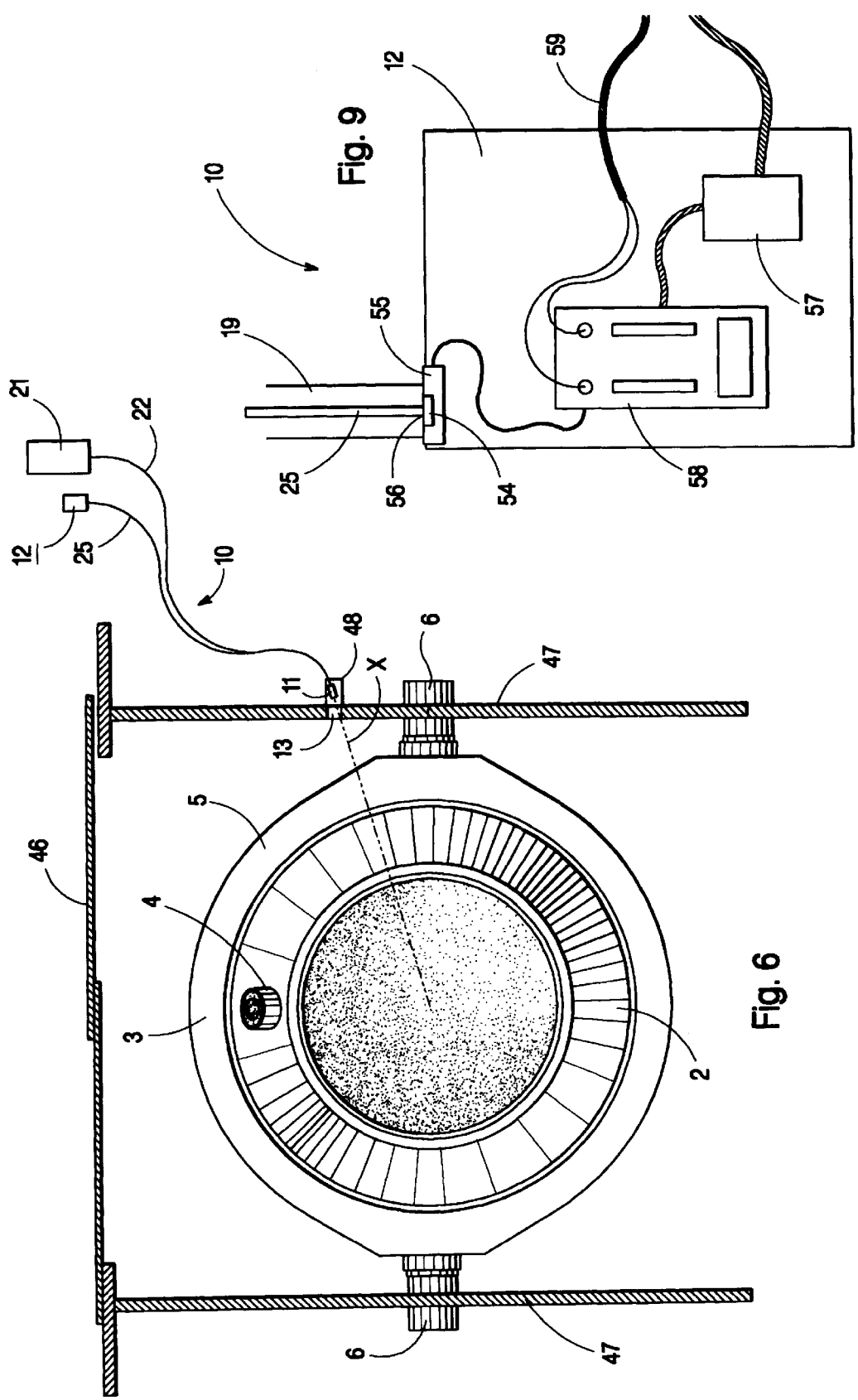

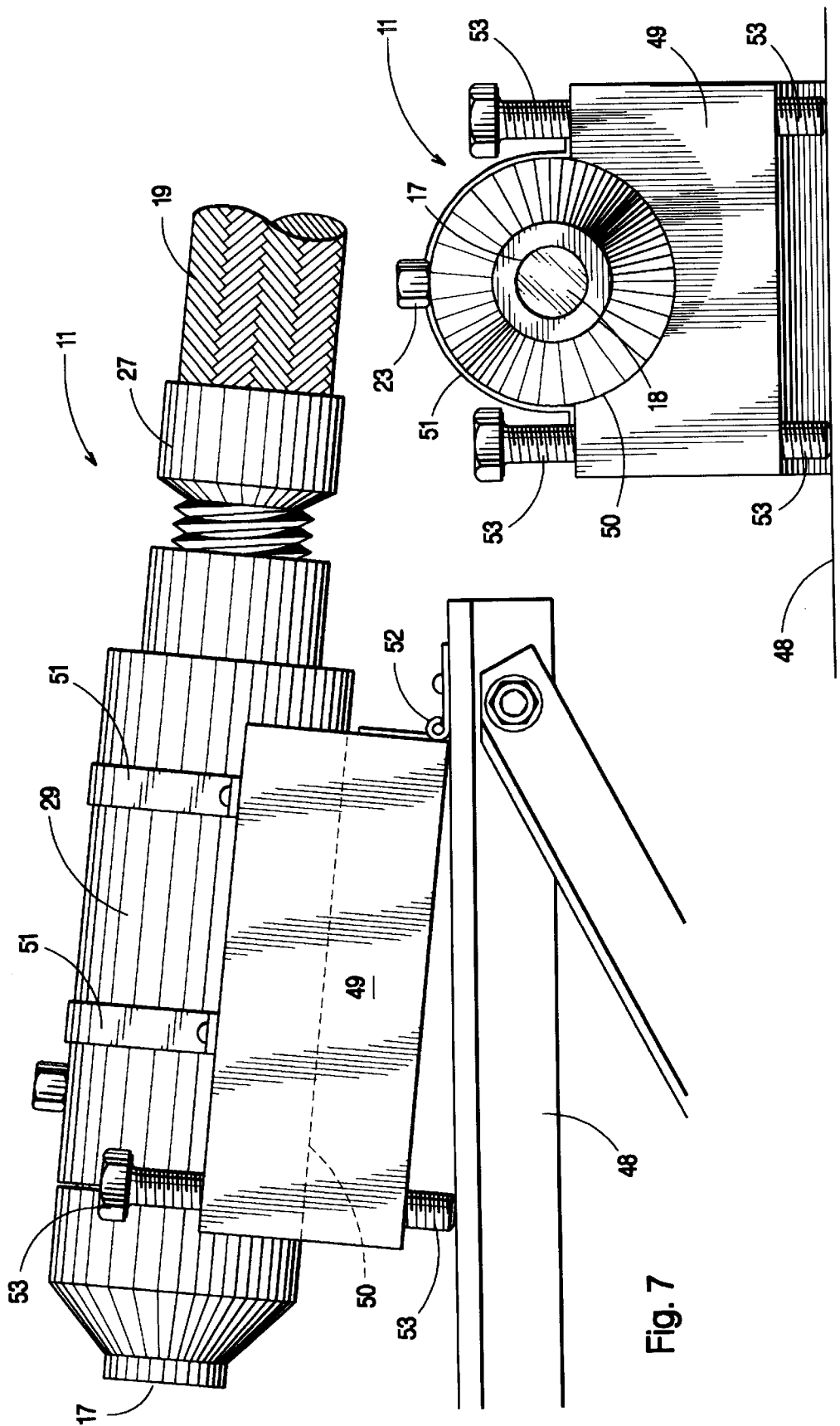

FIBER OPTIC SENSOR AND METHOD OF USE THEREOF TO DETERMINE CARBON CONTENT OF MOLTEN STEEL CONTAINED IN A BASIC OXYGEN FURNACE

BACKGROUND OF THE INVENTION

This invention is directed to a gas cooled fiber-optic cable apparatus for conveying radiant energy generated in a hostile environment to a radiation sensor located outside the hostile environment, and more particularly, it is directed to fiber-optic cable apparatus having a gas cooled radiation collecting end positioned adjacent the flame of a basic oxygen furnace (BOF) to convey radiant energy emitted from the flame to a radiation sensor located outside the hostile environment, and a method of using the conveyed radiant energy information to dynamically predict the carbon content of the steel contained in the BOF.

In the applicant's earlier U.S. Pat. No. 5,603,746 (herein incorporated in its entirety by reference), light energy emitted by the flame above the lip of a top-blown BOF is measured using a visible light sensor. The light intensity is measured as a function of the amount of oxygen blown during a heat, and three essential variables (X1, X2, and X3) that are determined in real time measurements. The values for the X1, X2, and X3 variables are used in a regression equation to calculate the carbon content of the molten steel bath during the oxygen blow that reduces the molten iron to steel. However, the 746 patent discloses sensor apparatus that is limited to measuring light emitted from an open or uncovered BOF flame, the flame being visible from almost any location along the charge and tap sides of the steelmaking shop. Such steelmaking vessels are commonly referred to as an open hood BOF, and the off-gas hood is spaced above the BOF lip leaving a large gap that provides an unobstructed view of the flame. The very visible flame makes aiming a light sensor relatively easy. For instance, during an oxygen blow, such off-gas hoods do not move downward to cover the lip of the steelmaking vessel. This provides a continuous easy line of sight that enables steelmakers to collect and measure light intensity without encountering major flame access problems. Knowing this, and taking into account the hostile environment immediately adjacent a BOF vessel, operators place light sensors at a distance of about 30 feet or more from the BOF vessel and at a height of about 5–6 feet above the operating floor of the BOF shop. At such locations, the light sensor equipment is placed in an environment where dust and fume concentrations are at a level that allows the forced air drat, disclosed in the 746 patent, to maintain a clean sighting window. This also places the sensor equipment in an ambient temperature range of about 66° C. or lower, well within the range where the forced air draft can prevent the electronics from overheating.

However, new more stringent air quality regulations have made it necessary for steelmakers to install more efficient BOF off-gas hood systems. The new state-of-the-art off-gas hoods have moveable portions that completely shroud the BOF lip during the blowing cycle of the steelmaking process, and the lowered position blocks visibility or access to the BOF flame. This prevents steelmakers from using past light sensor apparatus to measure flame intensity. As a result, it has become increasingly difficult for steelmakers to determine carbon content and oxygen turn down times when the moveable hoods shroud the vessel. Additionally, in instances where BOF vessels are equipped with tap side door and heat shield structures, the enclosed vessel is almost completely hidden from the operators view during the blow cycle when the tap-side doors are closed. Such environmental enclosures block flame visibility and prevent steelmakers from using past light sensors as taught in the 746 patent. Because closed furnace structures are now in wide use throughout the steelmaking industry, it is necessary for operators to cut small open windows through either the off-gas hood or the heat shields that surround the BOF vessel, and locate their light sensor devices within several inches of the flame. The open windows provide a line of sight to the BOF flame that enables the closely placed sensors to collect radiant energy. However, such close proximity to the BOF flame is fraught with problems when steelmakers use light sensor apparatus from the past. First, the electronic circuits required to collect and convert light energy into an electrical signal overheat when placed in the high temperature zone adjacent such windows in the furnace structures. Second, if the electronics withstand the high temperature adjacent the BOF flame, the deluge of dust and fume falling on a light collector at such locations overloads the collector with dirt and reduces the accuracy of light energy readings. This results in faulty carbon analysis. And third, splashing molten slag and steel associated with the BOF steelmaking process can cover the light gathering end of the sensor, solidify, and completely destroy its ability to receive light.

In view of the above disadvantages associated with current state-of-the-art light energy analysis, a long felt need has developed within the steelmaking industry to provide an improved light sensor device that is capable of operating within the hostile environment immediately adjacent a steelmaking furnace. The improved light sensor device must be capable of operating within high temperature ranges of up to about 550° C. or higher; it must be capable of repelling large amounts of dirt and fume generated by the steelmaking operation, and it must be capable of shielding its light gathering end from splashing molten steel and slag associated with the steelmaking process. The improved light sensor device must also be capable of preventing the hostile environment from damaging its sensitive electronics and light sensors that convert the light energy into an electrical signal for further processing in a programmable logic controller (PLC) to dynamically predict carbon content of the steel contained in the vessel.

SUMMARY OF THE INVENTION

It is therefore the first object of this invention to provide an improved light sensor device having a light-collecting end that is capable of being positioned in a hostile high temperature environment.

It is a further object of this invention to provide an improved light sensor device having a light collecting end that includes means to prevent dust and fume from settling on light gathering surfaces.

It is an additional object of this invention to provide an improved light sensor device having a light collecting end that includes means to prevent liquid metals and slags in a metallurgical operation from entering and clogging light gathering openings.

It is still a further object of this invention to provide an improved light sensor device having a light collecting end that includes gas cooled fiber-optic cable capable of being positioned in a hostile environment adjacent a metallurgical furnace.

It is another object of this invention to provide an improved light sensor device that includes a gas cooled fiber-optic cable that conveys collected light energy away from the hostile environment adjacent a metallurgical furnace, to a light sensor unit located in a remote area from the furnace.

It is a still another object of this invention to provide a method of using light collected by the improved light sensor device to determine the carbon content of molten steel contained in a top blown BOF steelmaking vessel.

In satisfaction of the foregoing objects and advantages, the present invention provides a gas cooled fiber-optic cable apparatus for use in a hostile environment. For instance, adjacent a flame combusting above the lip of a BOF furnace, and a method of using the apparatus to determine carbon content of molten steel. The fiber-optic cable comprises a radiation collection end having a manifold chamber that contains the fiber-optic filaments for collecting radiant energy, and a gas supply attached to the manifold chamber for injecting a cooling gas purge into the chamber. The manifold chamber includes a tip portion having an orifice proximate the fiber-optic filaments and adjustment means for regulating the amount of light or other radiation that falls on the receiving end of the fiber-optic cable. The orifice provides a means for collecting radiation within the manifold chamber and a discharge for expelling the purge gas from the manifold chamber. The gas cooled fiber-optic cable apparatus further includes a second end, opposite the radiation collection end, the second end including a radiation sensor that communicates with the PLC to dynamically predict carbon content of the steel.

BRIEF DESCRIPTION OF THE DRAWINGS

FIG. 1. is an elevation view showing the preferred fiber-optic cable device attached to the off-gas hood of a BOF converter.

FIG. 2. is a cross-section of the sensor end of the fiber-optic cable device shown attached to the off-gas hood in FIG. 1.

FIG. 3. is an enlarged cross-section of the sensor end.

FIG. 4. is a cross-section of the sensor end adjusted to a different position.

FIG. 6. is a plan view of the fiber-optic cable device shown in FIG. 5.

FIG. 7. is an enlarged elevation view of the fiber-optic cable device shown in FIG. 5.

FIG. 8. is an end view of the fiber-optic cable device shown in FIG. 7.

FIG. 9. is an enlarged schematic view of the light sensor portion shown attached to the optical fiber device in FIGS. 1, 3 and 4.

DETAILED DESCRIPTION OF THE PREFERRED EMBODIMENT

Figure 5:
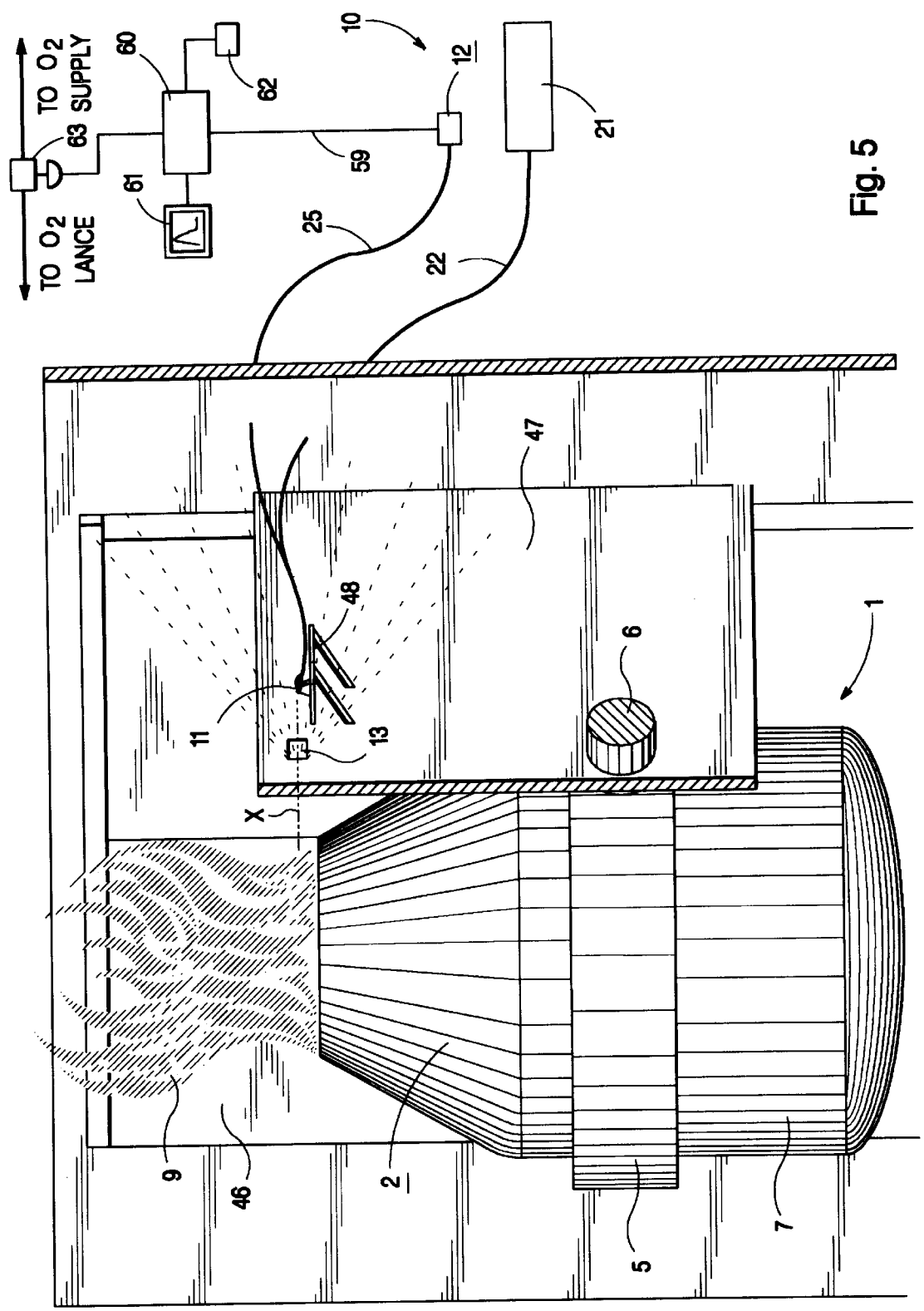
FIG. 5. is an elevation view showing the fiber-optic cable device attached to the heat shield of a BOF converter.

Referring to FIGS. 1 and 2 of the drawings, the preferred embodiment of the fiber-optic cable device 10 of the present invention is shown having its radiation collecting end 11 positioned adjacent a closed hood BOF 1, and its radiation sensor end 12 positioned at a location remote from the BOF furnace where temperature and steelmaking dust and fume are at reduced levels. The BOF vessel includes a charge side 2, a tap side 3 having a tap hole 4 from which slag and steel is poured during different steps of the steelmaking process, a trunnion ring 5, and bearing mounted trunnion shafts 6 that support and rotate vessel 7 between its upright steelmaking position, shown in FIG. 1, and its tilted charging and tapping positions. A moveable off-gas hood 8 is shown at its lowered steelmaking position where it captures the BOF flame 9 within its interior hood chamber 14; the chamber being attached to an exhaust system that directs steelmaking gas and fume to scrubbers (not shown), in order to comply with environmental regulations. As clearly shown in FIG. 1, when hood 8 is lowered over or placed directly above the lip of the steelmaking vessel 7, the BOF flame 9 is not readily visible from the operating floor of the shop, and collecting light energy emitted by the BOF flame, as practiced in the past, becomes very difficult or impossible. To illustrate, in instances where steel is refined in an open BOF, as taught in the 746 patent, the uncovered BOF flame is visible from almost any position along either the tap side or charge side of the operating floor. In such instances, the light sensor equipment is positioned at a selected position that is about 30' from the steelmaking vessel. This location is selected for a combination of reasons. First, because the open BOF flame is readily visible, the light gathering equipment is located on the operating floor as a matter of convenience for the steelmakers; at a location that is not in their way. Second, the 30 foot distance is selected because moving the light sensor appreciably closer to the vessel will expose its delicate electronics to heretofore described more hostile steelmaking environment where it could be damaged or destroyed by the higher temperatures, higher levels of dusts and fume, and splashing molten slag or steel. Therefore, before stringent environmental laws dictated covering the BOF flame, flame access was not a problem for steelmakers.

However, with the need to cover and capture the BOF flame for environmental purposes, steelmakers have largely lost the ability to use light energy analysis to determine carbon content in steel refining operations. Covered vessels limit flame access and also prevent collecting the light energy that is emitted by the flame. The present invention overcomes this problem by providing a fiber-optic cable having a gas cooled radiation collecting end that can be position within inches of the BOF flame, and a remote radiation sensor unit that is located outside the hostile steelmaking environment.

Referring again to the drawings, FIG. 2 shows an enlarged schematic cross-section view taken through a portion of the off-gas hood 8 shown in FIG. 1. Flame 9 is captured within chamber 14 of the off-gas hood. An aperture or open window 13 is cut through the wall of the hood to communicate with interior chamber 14 of the off-gas hood. The radiation collecting end 11 of the fiber-optic cable is attached to hood 8 by mounting brackets 15, or other suitable means, at a location adjacent window 13 and is positioned to receive light energy or radiant energy 16 emitted from the BOF flame. The radiant energy travels through open window 13, enters the radiation collecting end of the sensor device through orifice 17, and falls on a glass window 18 that is positioned against one end of the fiber-optic cable 25. The fiber optic cable is housed within a protective braided steel hose 19 that extends between its collection end 11 and its sensor end 12. The collected radiant energy, for example light energy, is conveyed along the length of the fiber-optic cable 25 within the shielded hose 19, where it excites a photocell, or other radiation sensing device, mounted within the unit 12 shown in FIG. 1. A stream of cooling gas 20, for instance clean air, nitrogen, or an inert gas, is injected into the light collecting end 11 of the optical-fiber cable 25 from a gas source 21 shown in FIG. 1. The cooling gas is delivered through a gas line 22 that is attached to a gas inlet 23. Inlet 23 communicates with an internal chamber 24 extending along a portion of the light collection end to provide a cooling gas envelope that surrounds and protects the light transmitting filaments 25 of the cable from the high temperatures adjacent the metallurgical furnace. The injected gas exits the internal chamber to provide a high velocity gas purge 21 discharged in an outward direction from orifice 17. The gas purge prevents dust, fume, and molten steel and slag, from entering the radiation collection end through orifice 17.

Referring to FIG. 3, the gas cooled fiber-optic cable apparatus comprises a shielded cable hose 19 swaged into a fitting 27 that is threaded into one end of a holder 28. Holder 28 is slideably captured within internal chamber 24 of a manifold tube 29. The holder maintains light transmitting filaments of the fiber-optic cable in a light collecting or radiation collection position against the surface of glass window 18. The fiber-optic cable is secured in place within cable tip 30 with fasteners 31 that extend through the wall of the cable tip and engage a protective bushing 32 that encircles the fiber-optic cable 25. The glass window is held in place against the filament ends by a cap ring 33 threaded onto end 34 of the holder 28. Orifice 17 is spaced apart from, and axially aligned with, glass window 18 to provide a line of sight "X" that extends through orifice 17 and falls upon the surface of the glass sighting window 18. Fasteners 36 extend through manifold tube 29 and clamp the cable tip 30 fast within chamber 24 to prevent it from moving toward or away from the manifold orifice 17. The cable tip includes a reduced portion 37 to provide a space or gap 38 between the inside surface of manifold wall 39 and the outside surface that extends along the length of the reduced portion 37. The inside surface of manifold wall 39 includes a tapered portion that provides a convergence 40 toward orifice 17, and the orifice opening is tapered to provide a divergence 41 in an outward direction from the manifold chamber. The convergence and divergence cause the gas purge to expand rapidly as it is expelled from the manifold chamber 24 to provide a supersonic gas purge that cools the radiation collection end of the fiber-optic cable device.

In the preferred embodiment, shown in FIGS. 3 and 4, the radiation collecting end comprises a nozzle 42 that is threaded onto end 35 of the manifold tube 29. Nozzle 42 includes both an inside wall surface that is tapered to provide the convergence 40 toward orifice 17, and a tapered orifice that provides the outward divergence 41. However, it should be understood that the two piece manifold tube and the nozzle combination could just as well be manufactured as a single piece that includes all the features disclosed above without departing from the scope of this invention.

Cooling or purge gas 20 is injected into space 38 through gas inlet 23 via gas line 22 attached to the gas source. The cooling gas supply is maintained at a temperature range of about 25° C. to provide sufficient cooling for the light collection end of the sensor. The pressurized cooling gas flows along the length of space 38 to effect a heat transfer away from both the manifold wall 39 and the holder 28, and into the cooling gas 20. This heat transfer maintains a safe operating temperature adjacent a metallurgical furnace as the warmed gas is purged at a high velocity from the manifold orifice 17. In the preferred embodiment, the cooling gas is purged from the manifold at a supersonic velocity.

The high velocity gas purge 21 shown in FIG. 2 prevents dust, fume, and molten materials from entering the manifold chamber 24 through orifice 17, and it maintains the glass sighting window 18 in a clean and clear operating condition for receiving and conveying radiant energy along the fiber-optic cable 25 to the remote light sensor located in a less hostile environment. As mentioned before, the supersonic gas purge is achieved by providing the divergence 41 at the orifice nozzle. The divergence causes a rapid expansion of the cooling gas as it is discharged through the nozzle and accelerates the gas purge to a supersonic velocity (greater than 1 Mach). The high velocity gas purge shields the manifold orifice 17 from splashing liquid metals and slags, and prevents such molten materials from entering and clogging the manifold chamber 24.

The sliding fit 43, extending along the outside surface 44 of holder 28 and the inside surface of manifold wall 39, enables users to adjust the amount of radiation that falls onto the light collecting filaments positioned against the sighting glass window 18. The adjustment is accomplished by sliding holder 28 either toward or away from the manifold orifice 17. By way of illustration, FIG. 3 shows holder 28 adjusted to a position where the sight glass window 18 is located within close proximity to the nozzle orifice 17. Such close proximity to the orifice causes a maximum amount of radiation to fall onto the light collecting filaments of the fiber-optic cable that transmits the collected radiant energy to the sensor located remote from the BOF vessel. However, conditions at certain steelmaking operations can cause radiant energy to be at such high levels that it over saturates the sensor device attached to the opposite end of the fiber-optic cable. Under such intense radiation conditions, operators must adjust holder 28 in a direction away from orifice 17 as shown in FIG. 4. This will reduce the amount of radiation falling onto the light collecting filaments. Such an adjusted position will either reduce or increase the amount of radiant energy transmitted along the fiber-optic cable and prevent either over saturating or over exposing the sensor device.

Referring to FIGS. 5 and 6, an alternate embodiment for monitoring radiation energy emitted from a BOF flame is shown enclosed within a structure comprising tap side doors 46 and heat shields 47. Such enclosed steelmaking vessels make carbon predictions based upon radiant energy difficult. In the alternate embodiment, the fiber-optic light sensor device 10 is shown with its gas cooled radiation collecting end 11 positioned on a support 48 attached to one of the heat shields 47 at an elevation that places collecting end 11 adjacent the enclosed BOF flame 9. The radiation sensor 12, and the gas supply 21 are shown positioned at locations remote from the hostile furnace side environment. As more clearly shown in FIG. 6, the BOF vessel 1 includes an open charge side 2 that provides vessel access for charging equipment that services the BOF, and a tap side 3 equipped with tap side doors 46 that are opened when vessel 7 is tilted for tapping operations. The extremely busy and dangerous activity along the charge and tap sides of a BOF prevent installing flame monitoring instruments at these locations. Therefore, the gas cooled radiation collection end 11 of the present invention is preferably located along one of the furnace sides that are covered by heat shields 47. A stationary off-gas hood (not shown) is generally used to exhaust such enclosed vessels, and flame 9 can be seen and monitored along the space between the BOF lip and the mouth of the off-gas hood. To accomplish this, the radiation collecting end 11 is positioned on support 48 along a line of sight "X" that extends from flame 9, through the open window 13 cut through heat shield 47, and onto the sight glass window 18 shown in FIGS. 2, 3, and 4.

Referring to FIGS. 7 and 8, support 48 comprises any convenient bracket arrangement that can be attached to the BOF heat shield and support the radiation collection end of the fiber-optic cable device. However, because the tap side door arrangement makes it necessary to position the light collector end at a more distant location from the flame, as compared to the off-gas hood embodiment shown in FIGS. 1 and 2, an adjustable saddle 49 is provided to "fine tune" the alignment of the collection end 11 with the line of sight "X" extending outward from flame 9 and through the open window 13. Saddle 49 includes a machined block having a seat 50 shaped to receive the manifold tube portion 29 of the radiation collecting end 11. Mounting brackets 51 clamp the radiation collector fast within seat 50, and the saddle includes a hinge 52 fastened to one end of the saddle and support 48. Adjustment screws 53 located near the end of the saddle opposite hinge 52 provide means to either raise or lower the radiation collector 11 into alignment with the line of sight "X", as shown in FIGS. 5 and 6. Proper alignment with the line of sight extending through the open window 13 allows a maximum amount of radiant energy from the energy source to fall on the glass sight window 18. The radiant energy 16 enters the manifold chamber 24 through orifice 17, and falls onto the glass sight window 18 where it is collected and conveyed along the fiber optic cable 25 to the photocell 54 or other radiation sensor device shown in FIG. 9 of the drawings.

Referring to FIG. 9, in the preferred embodiment, the light sensor unit 12 comprises a photocell 54; for example a selenium photocell or any other suitable device capable of converting a selected radiant energy range within the full spectrum into a voltage signal. The photocell is mounted in holder 55 that places photocell 54 in contact with end 56 of the fiber-optic cable opposite its light collecting end 11. A transformer 57 converts AC power to direct current to provide power to an amplifier 58 that increases the milli-volt signal received from the photocell, and the amplified output signal is sent along line 59 to the PLC 60 shown in FIG. 5.

Referring again to FIG. 5, the PLC unit may include a visual display 61 that shows information such as a light intensity curve, a continuing display of calculated real time carbon values, or a message indicating when the aim carbon for the heat has a been reached. Additionally, the PLC can be used to send a signal that activates an audio device 62, such as a bell or buzzer, to sound an alarm when aim carbon is reached, or send a signal to a control valve 63 that shuts off the oxygen blow to the vessel when aim carbon is reached; or both.

It should be understood that the above-disclosed fiber-optic cable sensor apparatus is not limited to receiving and measuring a specific range of wavelengths emitted from an energy source, and that any wavelength range, either visible or non-visible within the full range of the spectrum, can be received and measured to determine a product analysis as long as the collected energy can be converted into an electrical signal.

During an oxygen blow in a top-blown BOF vessel, the oxygen jet impinges on the metal bath and reacts with the carbon dissolved in the liquid metal to form a mixture of carbon monoxide (CO) and carbon dioxide ($CO_2$) gases. The gases rise to the top of the BOF vessel and the carbon monoxide combusts at the mouth of the vessel when it combines with oxygen in the surrounding air. As taught in earlier publications and the 746 patent, it is well known that a drop in flame intensity at the mouth of the BOF vessel corresponds to reduced carbon levels in the metal bath, and experienced BOF operators "estimate" carbon levels based upon flame brightness.

U.S. Pat. No. 5,603,746 teaches measuring flame intensity at the mouth of a BOF with a light meter. Such light meter devices are currently in use on BOF vessels at Bethlehem Steel operations. The carbon estimates calculated from the light meter readings are used to control the main oxygen blow when low carbon heats are produced in the vessels. The increased accuracy of such light based carbon estimations has reduced the frequency of carbon reblows and oxygen overblows at Bethlehem's steelmaking operations. In the past, calculation of "real-time" carbon estimates were based upon three variables X1, X2, and X3, where X2 is a ratio between a measured decrease in light intensity (DLI) at any given point in time from maximum Light Intensity (LI) until the end of the oxygen blow, and the Increase in Light Intensity (ILI) measured from the start of the main oxygen blow to a point of maximum LI (e.g., X2=DLI/ILI). The variable X3 is the measured amount of oxygen blown into the vessel during a period of time extending from an observed "kink" ($DO_2$kink) in a curve generated by light intensity measurements taken between the maximum LI to the end of the main blow.

It has now been discovered that by changing the variable X2 to a ratio between the Difference in Radiation Intensity and the Increase in Radiation Intensity (e.g., X2=DRI/IRI), where the (IRI) is measured from "charge scrap" to the Maximum Radiation Intensity (MRI), carbon prediction is improved by a factor of about a 6.6%. The term "charge scrap" (CS), is defined herein as the period of time in the steelmaking process when there is no liquid metal present in the BOF vessel (e.g., a cold vessel). In such instances, cold scrap may have been charged into the vessel, but the vessel has not yet received its charge of molten iron.

It has also been discovered that by changing the variable X3 to equal the amount of oxygen blown into the vessel after the new X2 variable is equal to about 0.90 or greater, with a preferred X2 value of 0.95, carbon prediction accuracy is further improved by about 4.8%. Therefore, if the new variables X2 and X3 are substituted for the old X2 and X3 variables taught in the 746 patent, operators realize about an 11% improvement in the accuracy of their carbon predictions as shown in the following Table 1.

TABLE 1

| | Old X2 From Start of $O_2$ Blow | New X2 From Start of Charge Scrap | % Improvement In Dynamic Carbon Prediction |
|---|---|---|---|
| Std. Deviation of Carbon Error (%) | 0.0061 | 0.0057 | 6.6% |
| | Old X3 5-consecutive light data points | New X3 X3 Measured When X2 ≧ 0.95 | % Improvement In Dynamic Carbon Prediction |
| Std. Deviation of Carbon Error (%) | 0.0063 | 0.0060 | 4.8% |

Combined Improvement using both the new X2 and the new X3 = 11.0%

Figure 10:
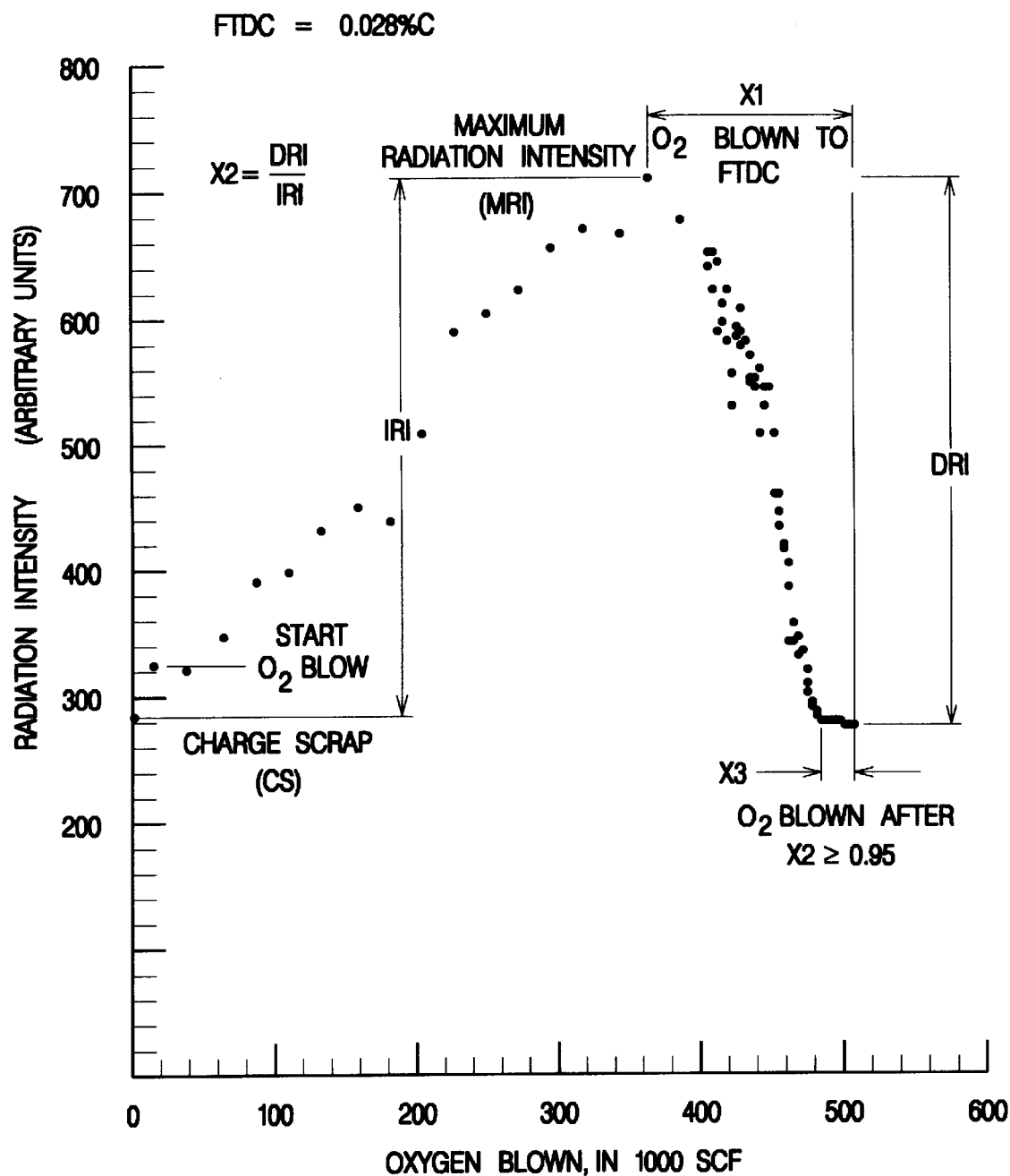
FIG. 10. is a graph showing light intensity levels in relation to oxygen blown.

Therefore, in an effort to improve carbon prediction accuracy, the First Turn Down Carbon (FTDC) for a BOF heat is now calculated using the variables X1, X2, and X3 listed below and shown along with plotted radiation intensity measurements in FIG. 10. As in the earlier patent, it is assumed that the transition from the oxygen flow rate to the liquid phase mass transfer control regime occurs after MRI is reached, therefore:

X1. Is the amount of oxygen blown into a BOF vessel during the liquid phase mass transfer regime ($O_2$ blow period extending from the point MRI to the end of the main oxygen blow).

X2. Is a real time ratio based on the decrease in radiation energy from MRI and the increase in radiation energy from CS to MRI (X2 ratio shown as DRI/IRI in FIG. 10).

X3. Is the amount of oxygen blown into the vessel after the X2 ratio reaches 0.95, (X3 shown along the substantially flat portion of the radiation intensity curve in FIG. 10).

The calculated values for X2 fall within a range that varies between 0.0 to 1.0. A small X2 value, such as 0.2, indicates a bright BOF flame and suggests that the carbon content of the steel is high. A large X2 value of 0.90 or higher indicates an almost non-existent flame and low carbon. Therefore, as exemplified in the preferred embodiment, the new X3 variable represents an amount of oxygen blown into the vessel at any given point in time after X2 is 0.95 or greater, a time when the carbon content of the metal bath is already quite low. This discovery provides about a 4.8% improvement in carbon predictions as compared to the prior art. In the prior art, $DO_2$kink is recognized only after five consecutive low light intensity measurements fall within a selected value range criterion. To illustrate, considering that the prior art teaches time averaging the DLI values every 4 seconds, the required five consecutive DLI measurements delay operators from recognizing $DO_2$kink until at least 20 seconds after the event has occurred. Additionally, under actual steelmaking conditions, noise in the milli-volt sensor signals, or short bursts of radiation caused by sparks erupting from the mouth of the vessel during the steel refining, produce abnormalities or spikes in the low radiation data points. Such spikes fail to fall within the low light intensity value range criterion and thereby extend the normal 20 second delay in recognizing $DO_2$kink to an even greater delay; the additional delay in X3 measurements causing an even greater error in the carbon determination calculations.

In the present invention, as soon as the selected value for the X2 variable is calculated, for example X2=0.95, the program begins to calculate X3 variables that represent the amount of oxygen blown into the vessel during the period extending from $DO_2$kink to the end of the main blow. The X3 measurements are entered into calculations for determining predicted carbon as taught in the earlier patent that is incorporated herein.

Extensive research indicates that the X1, X2, and X3 values are variables in a polynomial function of turn-down carbon as shown below.

turn-down carbon=f(X1, X2, X3)

Based upon this assumption, a regression equation relating to the carbon content of the melt to the three variables was developed as disclosed in applicant's earlier patent. The equation, with the substituted new variables, is used to estimate the turn-down carbon content of BOF heats in real time.

As long as the units of radiation intensity (RI) measurement are consistent, any unit of measurement, either arbitrary or absolute, may be used to measure the Radiation Intensity (RI) of the flame emitted from the BOF vessel. Thus, it can be readily appreciated that the advantages of the present invention can be achieved, not only by the exemplary ratio (DRI/IRI), but rather by any value which represents the drop in flame intensity in a dimensionless manner (e.g., which is made dimensionless or normalized by cancellation of measurement units in a ratio or otherwise). Additionally, the exemplary use of a DRI/IRI ratio represents only one of several ways of achieving the advantages of the present invention. Alternatives to the ratio DRI/IRI which become readily apparent upon reviewing the specification include, for instance, the reciprocal IRI/DRI of the ratio DRI/IRI, a ratio of the logarithms (i.e., log (DRI)/log (IRI)), the log of the ratio (i.e. log (DRI/IRI)), and the like. Such alternatives do not fall outside of the scope of the present invention.

Figure 11:
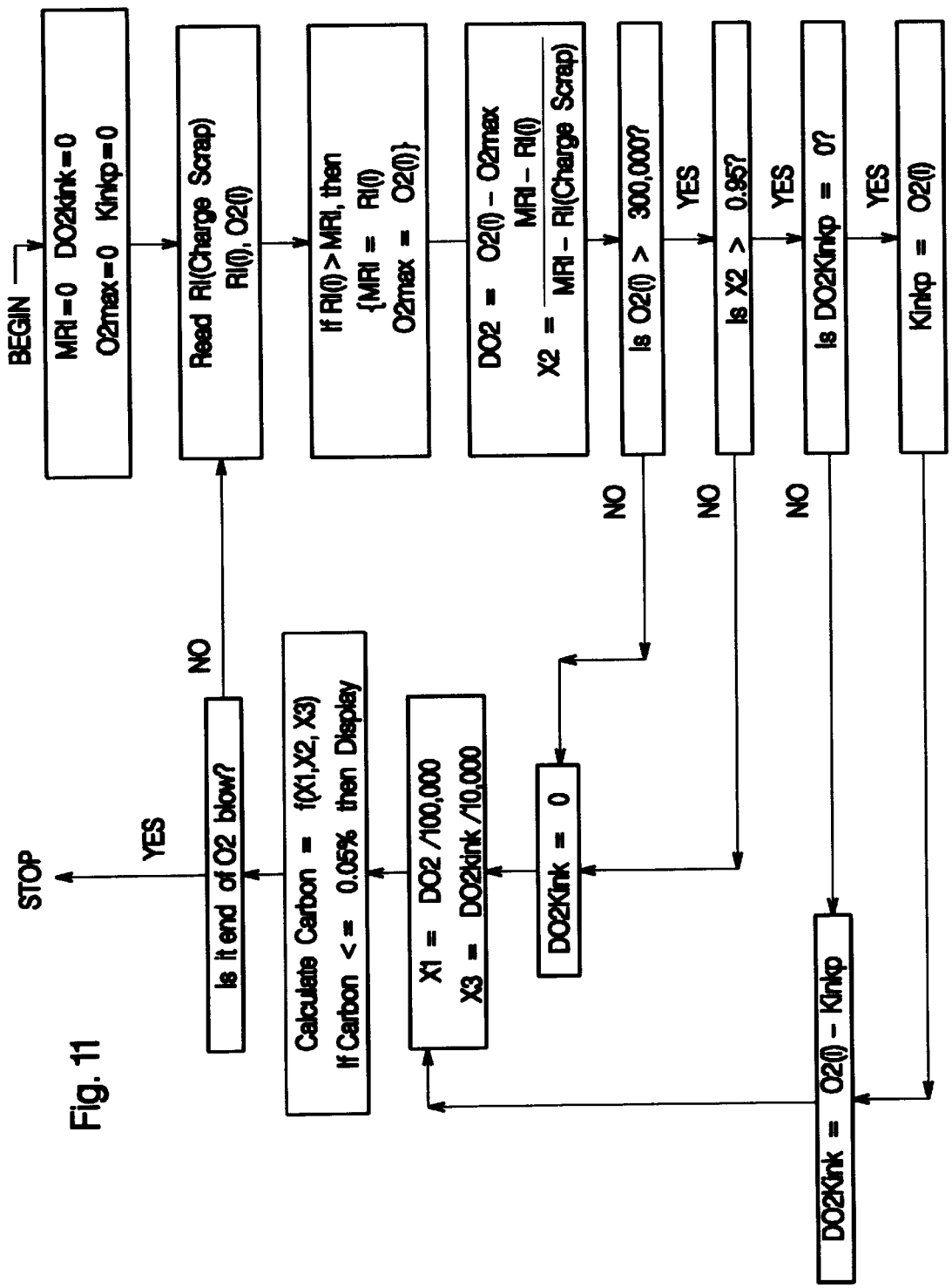
FIG. 11. is a flow chart of an exemplary program that may be used to determine in-blow carbon content and first turn down carbon based upon flame drop measurements and the amount of oxygen blown.

The program in the process computer, shown as an exemplary flow diagram in FIG. 11, uses the polynomial equation for estimating turn-down carbon from the measured X1, X2, and X3 variables. To illustrate, in dynamically estimating carbon in a heat from such an equation, the baseline radiation intensity is determined at "charge scrap," sometimes called a cold furnace. This is the first light or radiation intensity reading that is taken for a heat. When the oxygen blow is started, the PLC starts to capture the data, and begins to convey time averaged radiation intensity values, along with accumulated oxygen counts, to the process computer. During the first 80% of the main oxygen blow, the radiation intensity values are time-averaged once every minute over the last 10 seconds of the one minute time interval. In the last 20% of the blow, the radiation intensity values are time-averaged every 4 seconds. The exemplary computer program shown in FIG. 11 determines the peak (maximum) value of the radiation intensity during the blow (MRI). As the blow progresses, it determines the value for X1, as well as the values for the new X2, and X3 variables disclosed herein. The regression equation is then used to compute real-time carbon estimates using these three variables.

The present technique allows the computed carbon values to be updated every 4 seconds. However, it should be understood that any reasonable timing sequence can be used to update the computed carbon values. The calculated carbon values keep decreasing with the oxygen blow, and once the values are equal to or less than 0.05%, they are displayed to the pulpit operators in real time on a computer screen.

It was found that a small amount of "drift" in carbon prediction occurred from time to time. In certain instances, it was noticed that carbon estimates for a number of consecutive heats were averaging higher values than the actual turn-down carbon values. At other times, it was noticed that the carbon estimates were lower in value for a string of consecutive heats. Such drift in estimated carbon values is normally small in magnitude (up to about a maximum of ±0.005% carbon), and the reason for this drift is not very well understood. In order to counter this problem, a drift correction program was written. The program provides a comparison of the actual FTDC carbon and estimated carbon over a history of heats. For example, the last 10 low carbon heats produced in the vessel are compared and the mean absolute error in carbon estimation is determined. This mean error value is used for bias correction in carbon estimation and is performed automatically on every heat. The bias correction prevents the carbon estimation from "drifting" in either the positive or the negative direction, and forces the mean of carbon estimation error to be close to zero. It was found that the bias correction in carbon estimation improved carbon prediction by about 10%.

While this invention has been described as having a preferred design and method for predicting in-blow %carbon content and FTDC in a BOF heat, it is understood that it is capable of further modifications, uses, and/or adaptations following in general the principle of the invention and including such departures from the present disclosure as come within known or customary practice in the art to which the invention pertains, and as may be applied to the essential features set forth herein, that fall within the scope of the appended claims.

What is claimed is:

1. A gas cooled fiber-optic cable apparatus comprising:
   a) a first end adapted to collect radiation from an energy source, said first end including;
      ii) a manifold chamber defining a manifold tip having an orifice extending there through, said orifice providing means for collecting radiation within said manifold chamber, said orifice providing a means to expel a gas purge injected into said manifold chamber; and
      iii) a fiber-optic cable having a radiation collecting end positioned within said manifold chamber proximate said orifice, said fiber-optic cable being adjustable within said manifold chamber to locate said radiation collecting end at a selected position relative to said orifice extending through said manifold tip; and
   b) a second end remote from said first end and including a radiation sensor attached to the fiber-optic cable end opposite said radiation collecting end.

2. The apparatus recited in claim 1 wherein said manifold tip includes a tapered orifice that increases in size in an outward direction from said manifold chamber to expel said gas purge from said manifold at a supersonic velocity.

3. The apparatus recited in claim 1 wherein said radiation collecting end of said fiber-optic cable includes a cable holder having:
   a) a connection end fastened to a fitting on said fiber-optic cable portion, said connection end having an outside periphery adapted to slideably engage an inside surface of said manifold chamber, and
   b) a sight end having an outside periphery spaced apart from said inside surface of said manifold chamber to provide a space to receive said gas purge injected into said manifold chamber.

4. The apparatus recited in claim 3 including an aperture that extends through said cable holder between said connection end and said sight end, said aperture adapted to receive and clamp filaments extending outward from the fiber-optic cable fastened to said connection end of said cable holder.

5. The apparatus recited in claim 4 wherein at least one fastener extends through said manifold chamber wall at a location to engage and fix said cable holder at a selected position within said manifold chamber.

6. The apparatus recited in claim 4 including a glass window is attached to said sight end, said glass window covering said aperture extending through said cable holder, said filaments positioned within said aperture at a location adjacent said glass window.

7. The apparatus recited in claim 6 wherein said filaments positioned within said aperture contact a surface of said glass window.

8. The apparatus recited in claim 3 wherein said manifold tip includes a tapered orifice, said tapered orifice increasing in size in an outward direction from said manifold tip.

9. The apparatus recited in claim 1 wherein:
   a) said first end of said gas cooled fiber-optic cable apparatus is attached to an exhaust hood on a metallurgical furnace, said orifice of said manifold tip positioned adjacent an aperture extending through the exhaust hood to collect radiation emitted from a metallurgical flame contained therein; and
   b) said second end of said gas cooled fiber-optic cable apparatus positioned at a location remote from the metallurgical furnace.

10. The apparatus recited in claim 1 wherein:
    a) said first end of said gas cooled fiber-optic cable apparatus is attached to a heat shield that encloses a metallurgical furnace, said orifice of said manifold tip positioned adjacent an aperture extending through the heat shield to collect radiation emitted from a metallurgical flame contained therein; and
    b) said second end of said gas cooled fiber-optic cable apparatus positioned at a location remote from the metallurgical furnace.

11. The apparatus recited in claim 10 including a saddle block that supports said first end of said gas cooled fiber-optic cable apparatus adjacent the aperture extending through the heat shield, said saddle including means to adjust the elevation of said first end to align said orifice, of said manifold tip, along a line of sight extending from the metallurgical flame, through the aperture in the heat shield, and into said radiation collection end positioned within said manifold chamber.

12. The apparatus recited in claim 11 wherein said saddle block includes:
    a) a seat and clamp combination adapted to cradle and fix said first end of said gas cooled fiber-optic cable apparatus within said saddle block;
    b) a pivot end attached to a bracket arrangement extending outward from the heat shield; and
    c) an adjustment end opposite said pivot end, said adjustment end responsive to the rotation of an adjustment screw, said adjustment screw extending through said saddle block.

13. A method for determining the carbon content of a molten steel bath in a BOF vessel, the steps of the method comprising:
    a) transmitting along a gas cooled fiber-optic cable to a radiation measuring device, radiant energy emitted from the BOF vessel at charge scrap;
    b) initiating an oxygen blow into the BOF vessel;
    c) measuring radiation intensity emitted from a flame combusting above the BOF vessel including;
       i) measuring an increase in radiation (IRI), from said charge scrap to a point of maximum radiation intensity (MRI);
       ii) measuring a real time value (DRI) indicative of a decrease in radiation from said (MRI);
       iii) calculating a value based upon said (IRI) measurement and said (DRI) value;
    d) measuring an amount of oxygen blown ($DO_2$) into the liquid metal;
    e) calculating in-blow % carbon content of the molten steel bath using said value in step c)iii) and said measured $DO_2$ in step d);
    f) discontinuing said oxygen blow when an in-blow % carbon content equal to an aim carbon for the heat is calculated in step e); and
    g) tapping the molten steel bath, having an in-blown % carbon content equal to said aim carbon, for further processing into a finished steel product.

14. The method recited in claim 13 wherein the step c)iii) calculates a ratio X2 where X2=DRI/IRI.

15. The method recited in claim 14 wherein the step e) begins measuring X3 values to calculate in-blow % carbon content of the molten steel when the ratio X2=0.9 or higher.

16. The method recited in claim 14 wherein the step e) begins X3 values when the ratio X2=0.95.

17. The method recited in claim 13 wherein said in-blow % carbon content in step e) is calculated based upon:

a) a continuous real-time normalized value indicative of a drop in said radiation intensity, said real-time normalized value determined by said DRI values, said IRI measurement; and b) said measured $DO_2$ amounts.

18. The method recited in claim 17 wherein said normalized value is calculated until an aim carbon is calculated in the step calculating in-blow % carbon content of the molten steel bath.

19. The method recited in claim 13 wherein said in-blow % carbon content in step e) is calculated based upon:

a) a continuous real-time dimensionless value indicative of a drop in said radiation intensity, said real-time dimensionless value determined by said DRI values, said IRI measurement; and b) said measured $DO_2$ amounts.

20. The method recited in claim 19 wherein said dimensionless value is calculated until an aim carbon is calculated in the step calculating in-blow % carbon content of the molten steel bath.

21. A method for determining carbon content in a BOF vessel, the steps of the process comprising:

a) measuring radiant energy emitted from the BOF vessel at charge scrap;

b) initiating an oxygen blow into the BOF vessel;

c) measuring radiation intensity emitted from a flame combusting above the BOF vessel including;
  i) measuring an increase in radiation (IRI), from said charge scrap to a point of maximum radiation intensity (MRI);
  ii) measuring a real time value (DRI) indicative of a decrease in radiation from said (MRI);
  iii) calculating a value based upon said (IRI) measurement and said (DRI) value;

d) measuring an amount of oxygen blown ($DO_2$) into the liquid metal;

e) calculating in-blow % carbon content of the molten steel bath using said value in step c)iii) and said measured $DO_2$ in step d);

f) discontinuing said oxygen blow when an in-blow % carbon content equal to an aim carbon for the heat is calculated in step e); and g) tapping the molten steel bath, having an in-blown % carbon content equal to said aim carbon, for further processing into a finished steel product.

22. The method recited in claim 21 wherein the step c)iii) calculates a ratio X2 where X2=DRI/IRI.

23. The method recited in claim 22 wherein the step e) begins measuring X3 values to calculate in-blow % carbon content of the molten steel when the ratio X2=0.9 or higher.

24. The method recited in claim 22 wherein the step e) begins X3 values when the ratio X2=0.95.

25. The method recited in claim 21 wherein said in-blow % carbon content in step e) is calculated based upon:

a) a continuous real-time normalized value indicative of a drop in said radiation intensity, said real-time normalized value determined by said DRI values, said IRI measurement; and b) said measured $DO_2$ amounts.

26. The method recited in claim 25 wherein said normalized value is calculated until an aim carbon is calculated in the step calculating in-blow % carbon content of the molten steel bath.

27. The method recited in claim 21 wherein said in-blow % carbon content in step e) is calculated based upon:

a) a continuous real-time dimensionless value indicative of a drop in said radiation intensity, said real-time dimensionless value determined by said DRI values, said IRI measurement; and b) said measured $DO_2$ amounts.

28. The method recited in claim 27 wherein said dimensionless value is calculated until an aim carbon is calculated in the step calculating in-blow % carbon content of the molten steel bath.

* * * * *